(12) United States Patent
Hubbard et al.

(10) Patent No.: US 11,866,171 B2
(45) Date of Patent: Jan. 9, 2024

(54) ROTATING FLIGHT CONTROL SURFACE FOR AIRCRAFT

(71) Applicant: The Boeing Company, Chicago, IL (US)

(72) Inventors: Andrew J. Hubbard, Saint Charles, MO (US); Richard C. Potter, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 92 days.

(21) Appl. No.: 17/658,374

(22) Filed: Apr. 7, 2022

(65) Prior Publication Data
US 2023/0322357 A1    Oct. 12, 2023

(51) Int. Cl.
  *B64C 9/02*    (2006.01)
  *B64C 9/20*    (2006.01)
  *B64C 39/12*    (2006.01)
  *B64C 9/00*    (2006.01)

(52) U.S. Cl.
  CPC .............. *B64C 9/02* (2013.01); *B64C 9/20* (2013.01); *B64C 39/12* (2013.01); *B64C 2009/005* (2013.01)

(58) Field of Classification Search
  CPC .................................... B64C 9/02; B64C 3/50
  See application file for complete search history.

(56) References Cited

U.S. PATENT DOCUMENTS

| | | | | |
|---|---|---|---|---|
| 2,556,126 A | * | 6/1951 | Walter ............... | C07D 251/58 544/202 |
| 3,985,319 A | * | 10/1976 | Dean .................... | B64C 9/16 244/216 |
| 4,049,219 A | * | 9/1977 | Dean .................... | B64C 9/20 244/217 |
| 6,299,108 B1 | * | 10/2001 | Lindstrom ......... | B64D 45/0005 244/99.3 |
| 2005/0230565 A1 | * | 10/2005 | Kallinen ............. | B64C 23/06 244/217 |
| 2007/0267541 A1 | * | 11/2007 | Honorato Ruiz .... | B64C 9/02 244/99.3 |
| 2016/0176507 A1 | * | 6/2016 | Fevergeon ........... | B64C 9/02 244/99.3 |
| 2016/0176508 A1 | * | 6/2016 | Fevergeon ........... | B64C 9/16 244/99.3 |
| 2020/0255124 A1 | * | 8/2020 | Tessier ................ | B64C 9/00 |

\* cited by examiner

*Primary Examiner* — Philip J Bonzell
*Assistant Examiner* — Cindi M Curry
(74) *Attorney, Agent, or Firm* — Quinn IP Law

(57) ABSTRACT

An aerodynamic device includes a main aerodynamic body having a leading edge and a trailing edge, a flight control surface coupled to the main aerodynamic body near the trailing edge of the main aerodynamic body, and a rotating body coupled to the flight control surface. The rotating body is rotatable relative to the flight control surface between a stowed position and a deployed position to define a gap. The rotating body is rotated toward the main aerodynamic body while in the stowed position to close the gap. The rotating body is rotated away from the main aerodynamic body while in the deployed position to widen the gap. The gap adjusts an airflow flowing between the main aerodynamic body and the flight control surface.

20 Claims, 9 Drawing Sheets

ROTATING FLIGHT CONTROL SURFACE FOR AIRCRAFT

TECHNICAL FIELD

The present disclosure generally relates to aircraft. In particular, the present disclosure describes a rotating flight control surface for aircraft.

BACKGROUND

Aircraft include flight control surfaces. These flight control surfaces may move relative to a stationary structure of the aircraft to facilitate changes to the aircraft speed or orientation during flight. It is therefore desirable to continue research and development efforts to improve flight control surfaces.

SUMMARY

An aerodynamic device is disclosed herein. The aerodynamic device includes a main aerodynamic body, a flight control surface, and a rotating body. The main aerodynamic body has a leading edge and a trailing edge opposite the leading edge. The flight control surface is coupled to the main aerodynamic body proximate the trailing edge of the main aerodynamic body. The rotating body is coupled to the flight control surface. The rotating body is rotatable relative to the flight control surface between a stowed position and a deployed position to define a gap between the main aerodynamic body and the rotating body. The rotating body is rotated toward the main aerodynamic body while in the stowed position to close the gap. The rotating body is rotated away from the main aerodynamic body while in the deployed position to widen the gap. The gap adjusts an airflow flowing between the main aerodynamic body and the flight control surface.

In one or more embodiments of the aerodynamic device, the flight control surface is pivotally coupled to the main aerodynamic body to facilitate pivotal movement of the flight control surface relative to the main aerodynamic body between a cruise configuration and a deflected configuration. The rotating body is in the stowed position while the flight control surface is in the cruise configuration. The rotating body is in the deployed position while the flight control surface is in the deflected configuration.

In one or more embodiments of the aerodynamic device, the flight control surface is aligned with a body plane defined by the main aerodynamic body while in the cruise configuration. The flight control surface is obliquely angled relative to the body plane defined the main aerodynamic body while in the deflected configuration.

In one or more embodiments, the aerodynamic device further includes a hinge pivotally coupling the flight control surface to the main aerodynamic body. The hinge remains inside the main aerodynamic body while the flight control surface moves between the cruise configuration and the deflected configuration.

In one or more embodiments, the aerodynamic device further includes a four-bar linkage at least partly disposed within the main aerodynamic body. The four-bar linkage pivotally interconnects the main aerodynamic body and the rotating body. The four-bar linkage transitions the rotating body between the stowed position and the deployed position in response to rotation of the flight control surface.

In one or more embodiments of the aerodynamic device, the main aerodynamic body is one of a wing, a horizontal stabilizer, a vertical stabilizer, or a canard.

In one or more embodiments of the aerodynamic device, the flight control surface is one of a flap, a flaperon, an aileron, an elevator, a rudder, or a ruddervator.

In one or more embodiments, the aerodynamic device further includes a first shroud pivotally coupled to the main aerodynamic body and configured to further define the gap.

In one or more embodiments of the aerodynamic device, a rotation between the first shroud and the main aerodynamic body defines an overlap between an aftmost point on the first shroud and a forward-most point of the rotating body that further adjusts the airflow.

In one or more embodiments of the aerodynamic device, the aerodynamic device is characterized by an absence of an external bump located where the flight control surface is coupled to the main aerodynamic body. The external bump protrudes from the flight control surface.

An aircraft is provided herein. The aircraft includes a fuselage and a wing. The wing is coupled to the fuselage. The wing includes a main aerodynamic body, a flight control surface, and a rotating body. The main aerodynamic body has a leading edge and a trailing edge opposite the leading edge. The flight control surface is coupled to the main aerodynamic body near the trailing edge of the main aerodynamic body. The rotating body is coupled to the flight control surface. The rotating body is rotatable relative to the flight control surface between a stowed position and a deployed position to define a gap between main aerodynamic body and the rotating body. The rotating body is rotated toward the main aerodynamic body while in the stowed position to close the gap. The rotating body is rotated away from the main aerodynamic body while in the deployed position to widen the gap. The gap adjusts an airflow flowing between the main aerodynamic body and the flight control surface.

In one or more embodiments of the aircraft, the flight control surface is pivotally coupled to the main aerodynamic body to facilitate pivotable movement of the flight control surface relative to the main aerodynamic body between a cruise configuration and a deflected configuration. The rotating body is in the stowed position while the flight control surface is in the cruise configuration. The rotating body is in the deployed position while the flight control surface is in the deflected configuration.

In one or more embodiments of the aircraft, the flight control surface is aligned with a body plane defined by the main aerodynamic body while in the cruise configuration. The flight control surface is obliquely angled relative to the body plane defined the main aerodynamic body while in the deflected configuration.

In one or more embodiments, the aircraft further includes a hinge pivotally coupling the flight control surface to the main aerodynamic body. The hinge remains inside the main aerodynamic body while the flight control surface moves between the cruise configuration and the deflected configuration.

In one or more embodiments, the aircraft further includes a four-bar linkage at least partly disposed within the main aerodynamic body. The four-bar linkage pivotally interconnects the main aerodynamic body and the rotating body. The four-bar linkage transitions the rotating body between the stowed position and the deployed position in response to rotation of the flight control surface.

In one or more embodiments of the aircraft, the main aerodynamic body is one of a wing, a horizontal stabilizer, a vertical stabilizer, or a canard.

In one or more embodiments of the aircraft, the flight control surface is one of a flap, a flaperon, an aileron, an elevator, a rudder, or a ruddervator.

In one or more embodiments, the aircraft further includes a first shroud pivotally coupled to the main aerodynamic body and configured to further define the gap.

In one or more embodiments of the aircraft, a rotation between the first shroud and the main aerodynamic body defines an overlap between an aftmost point on the first shroud and a forward-most point of the rotating body that further adjusts the airflow.

A method for aerodynamic control is provided herein. The method includes coupling a flight control surface to a main aerodynamic body proximate a trailing edge of the main aerodynamic body, and coupling a rotating body to the flight control surface. The rotating body is rotatable relative to the flight control surface between a stowed position and a deployed position to define a gap between the main aerodynamic body and the rotating body. The method includes rotating the rotating body toward the main aerodynamic body while in the stowed position to close the gap, and rotating the rotating body away from the main aerodynamic body while in the deployed position to widen the gap. The gap adjusts an airflow flowing between the main aerodynamic body and the flight control surface.

The above features and advantages and other features and advantages of the present teachings are readily apparent from the following detailed description of the modes for carrying out the present teachings when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

The effectiveness of trailing-edge flight control surfaces may be enhanced by establishing a gap between a fixed portion of the main aerodynamic body and a moving structure of a trailing-edge flight control surface. A proper gap and overlap are typically established using a hinge line that is off the body of the main aerodynamic body, or by other external mechanisms, to support and position the trailing-edge flight control surface. An external fairing, or bump, outside the main aerodynamic body typically houses the mechanisms. An elimination of the bumps external to the main aerodynamic shape may reduce the related drag at cruise conditions. Existing designs for simple flap hinges within the main aerodynamic body preclude the creation of an effective gap between the main aerodynamic body and the trailing-edge flight control surface while deployed. Various embodiments of the present disclosure relate to a mechanism that enables the creation of an effective gap and overlap for a bump-less, hinged trailing-edge flight control surface through a rotation of a forward portion of the flight control surface while deployed.

Figure 1:
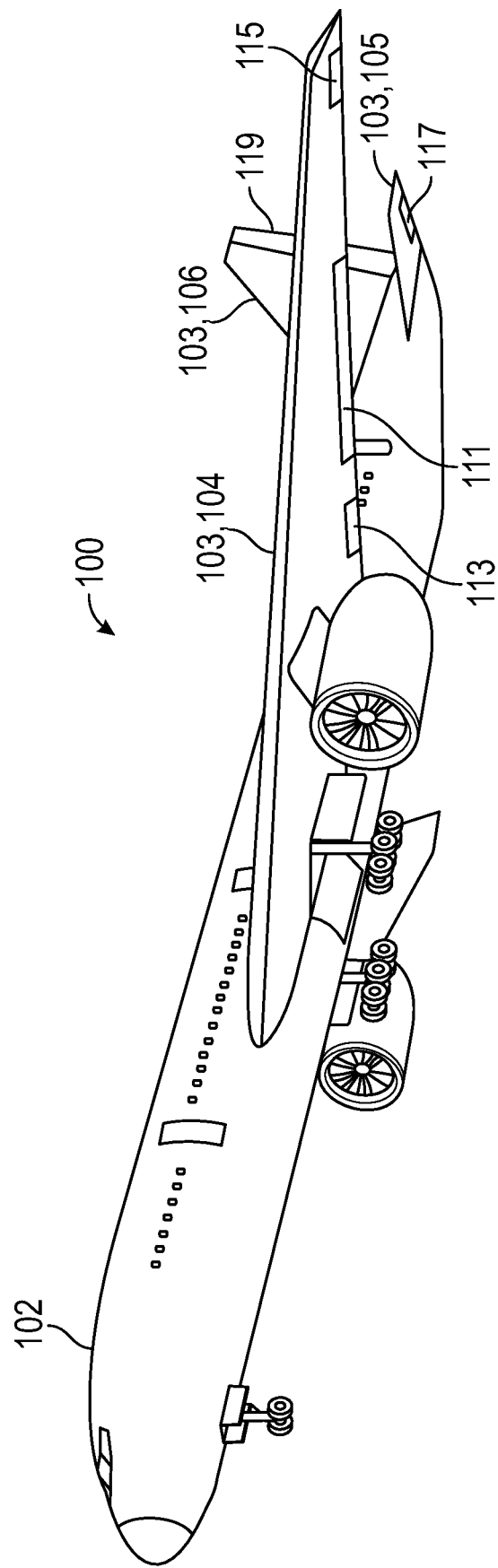
FIG. 1 is a schematic isometric view of an aircraft including a plurality of aerodynamic surfaces.

With reference to FIG. 1, an aircraft 100 includes a fuselage 102 and one or more aerodynamic devices 103, such as a wing 104, a horizontal stabilizer 105, and/or a vertical stabilizer 106, coupled to the fuselage 102. The wing 104, the horizontal stabilizer 105, or the vertical stabilizer 106 may be referred to individually as an aerodynamic body. Other common names for these aerodynamic devices include, but are not limited to tail surfaces, fins, canards, rudders, elevators, etc. The wing 104 includes one or more sets of flaps 111, one or more sets of flaperons 113, and/or one or more sets of ailerons 115. The horizontal stabilizer 105 as illustrated includes an elevator 117. The vertical stabilizer 106 as illustrated includes a rudder 119.

Figure 2:
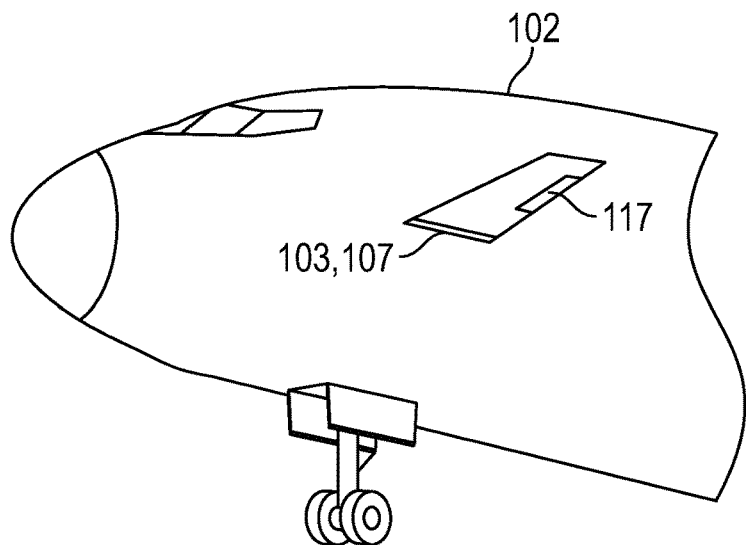
FIG. 2 is schematic partial isometric view of the aircraft including a canard.

With reference to FIG. 2, the aerodynamic devices 103 may include a canard 107. The canard 107 may include an elevator 117 on each side of the fuselage 102. The canard 107 is generally near a nose of the aircraft 100.

Figure 3:
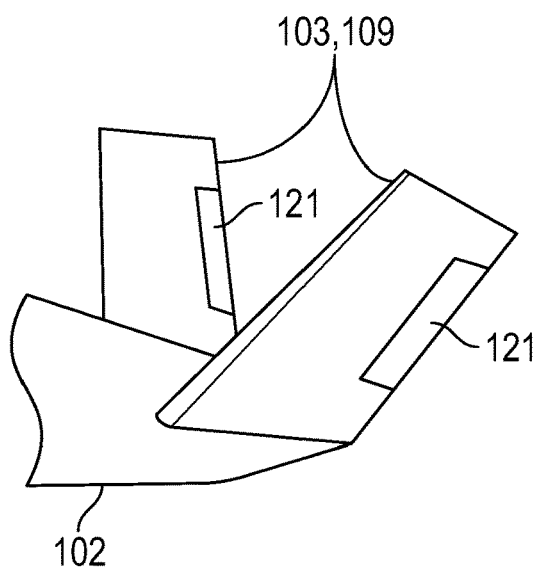
FIG. 3 is schematic partial isometric view of the aircraft including a v-tail.

With reference to FIG. 3, the aerodynamic devices 103 may include a v-tail 109. Each side of the v-tail 109 may include a ruddervator 121. The ruddervators 121 combine the functions of both the rudder 119 (FIG. 1) and the elevator 117 (FIG. 1). The v-tail 109 is located proximate a tail of the aircraft 100.

Figure 4:
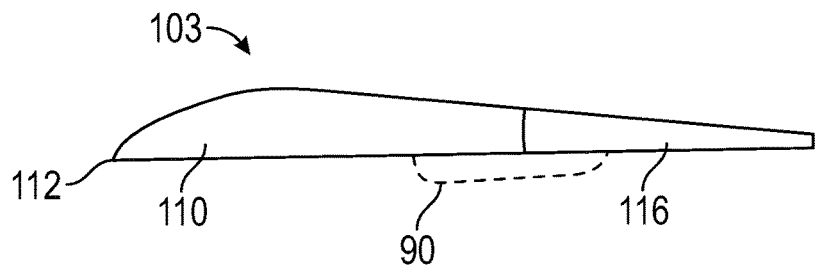
FIG. 4 is schematic cross-section side view of an aerodynamic device.
Figure 5:
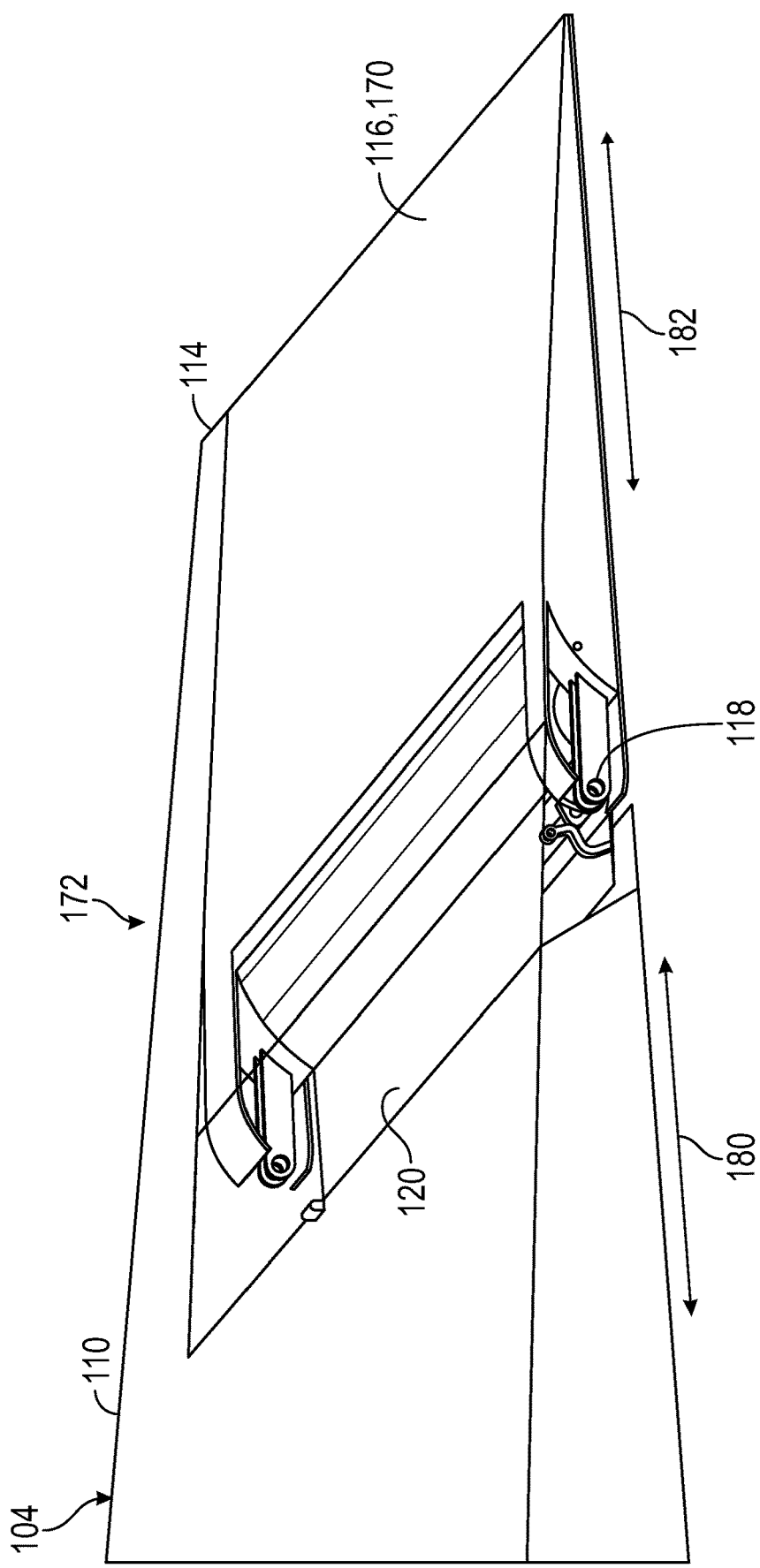
FIG. 5 is a schematic isometric view of the aerodynamic device in a cruise configuration.
Figure 6:
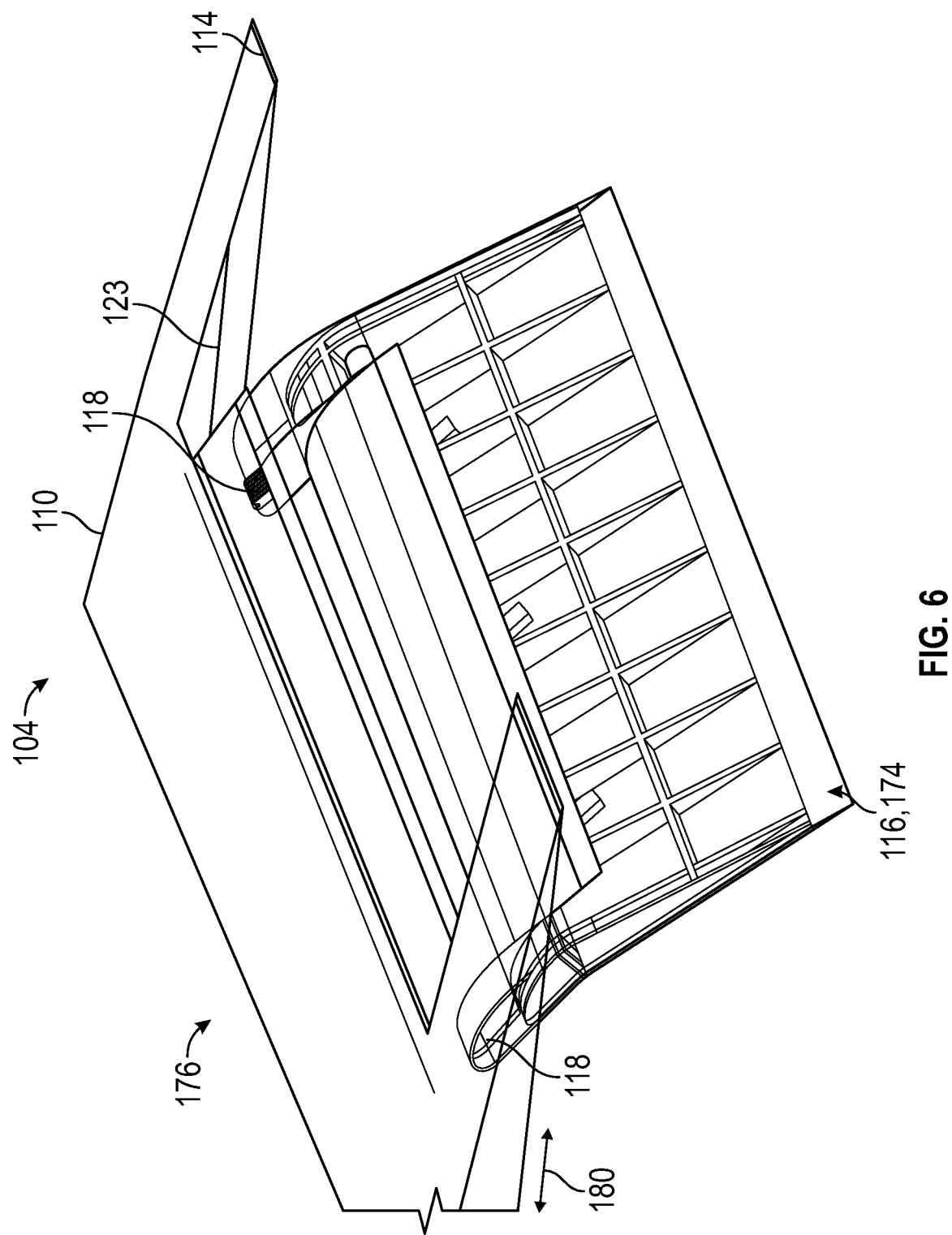
FIG. 6 is a schematic isometric view of the aerodynamic device in a deflected configuration.

With reference to FIGS. 4, 5, and 6, the aerodynamic device 103 includes a main aerodynamic body 110 having a leading edge 112 (FIG. 4) and a trailing edge 114 (FIG. 5). The trailing edge 114 is opposite the leading edge 112. The aerodynamic device 103 further includes a flight control surface 116 coupled near the trailing edge 114 of the main aerodynamic body 110. In other words, the flight control surface 116 is coupled at the aft end of the aerodynamic device 103 for at least some portion of the span of the aerodynamic device 103. As non-limiting examples, the flight control surface 116 may be configured as a flap 111, an aileron 115, or a flaperon 113, as illustrated in FIG. 1. The flight control surface 116 may also, for example, be configured as an elevator 117 (e.g., a horizontal stabilizer) or a rudder 119 (e.g., a vehicle stabilizer) as illustrated in FIGS. 1 and 2, or a ruddervator 121 for the aircraft 100 as illustrated in FIG. 3. Regardless of its configuration, the main aerodynamic body 110 has a recess 123 (FIG. 6) sized and shaped to partially receive the flight control surface 116 when stowed in a cruise position. The aerodynamic device 103 is characterized by a lack (or absence) of an external bump 90 located where the flight control surface 116 is coupled to the main aerodynamic body 110 protruding from (or extending away from) the flight control surface 116 and/or the main aerodynamic body 110.

Figure 7:
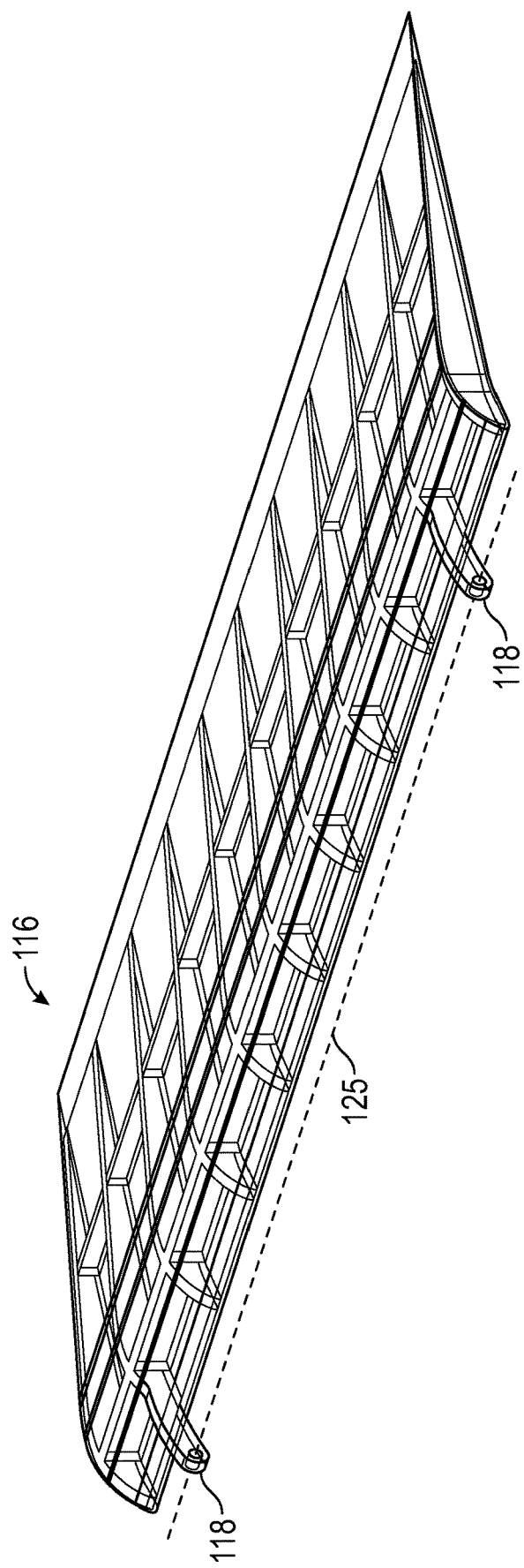
FIG. 7 is a schematic isometric view of a flight control surface of the aerodynamic device.

With reference to FIGS. 5, 6, and 7, the flight control surface 116 is movably coupled to the main aerodynamic body 110. As such, the flight control surface 116 is configured to move between a straight position 170 while in a cruise configuration 172 (FIG. 5) and a fully deflected position 174 while in a deflected configuration 176 (FIG. 6). The flight control surface 116 may move and stop at multiple deflected positions between the straight position 170 and the fully deflected position 174. In the fully deflected position 174, a control plane 182 of the flight control surface 116 is obliquely angled relative to a body plane 180 of the main aerodynamic body 110 to promote additional force relative to its position. In the straight position 170, the control plane 182 of the flight control surface 116 is substantially parallel to the body plane 180 of the main aerodynamic body 110 to limit resistance to forward propulsion of the aircraft 100. To facilitate movement between the straight position 170 and the fully deflected position 174, the flight control surface 116 is pivotally coupled to the main aerodynamic body 110. For example, the flight control surface 116 may include one or more hinges 118 that facilitate pivotal coupling of the main aerodynamic body 110 to the flight control surface 116. For example, the flight control surface 116 may include two hinges 118 disposed inboard and outboard, and aligned along an axis of rotation 125 (FIG. 7). It is contemplated, however, that the flight control surface 116 may not move along a single axis. The flight control surface 116 may be rotated and translated using, for example, a motor or other mechanism. The aerodynamic device 103 may include one or more suitable actuation mechanisms to move the flight control surface 116 (e.g., flap) relative to the main aerodynamic body 110. In various embodiments, the hinges 118 and/or mechanism may be located within the main aerodynamic body 110 to avoid implementation of the external bumps 90 (FIG. 4) to house the hinges 118 and/or mechanisms.

Figure 8:
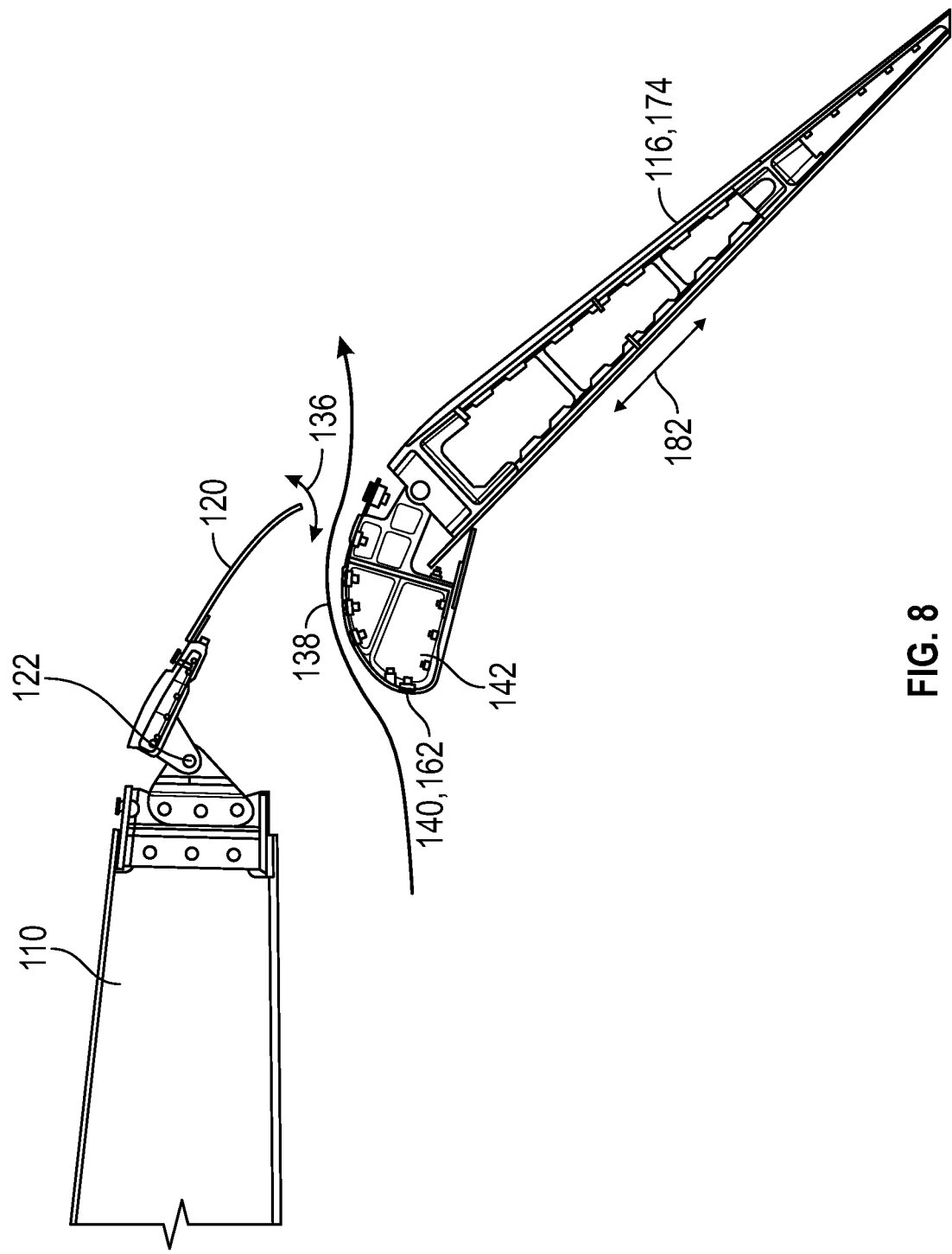
FIG. 8 is a schematic cross-sectional side view of the aerodynamic device showing the flight control surface in a fully deflected position and the rotating body deflected to a deployed position.
Figure 9:
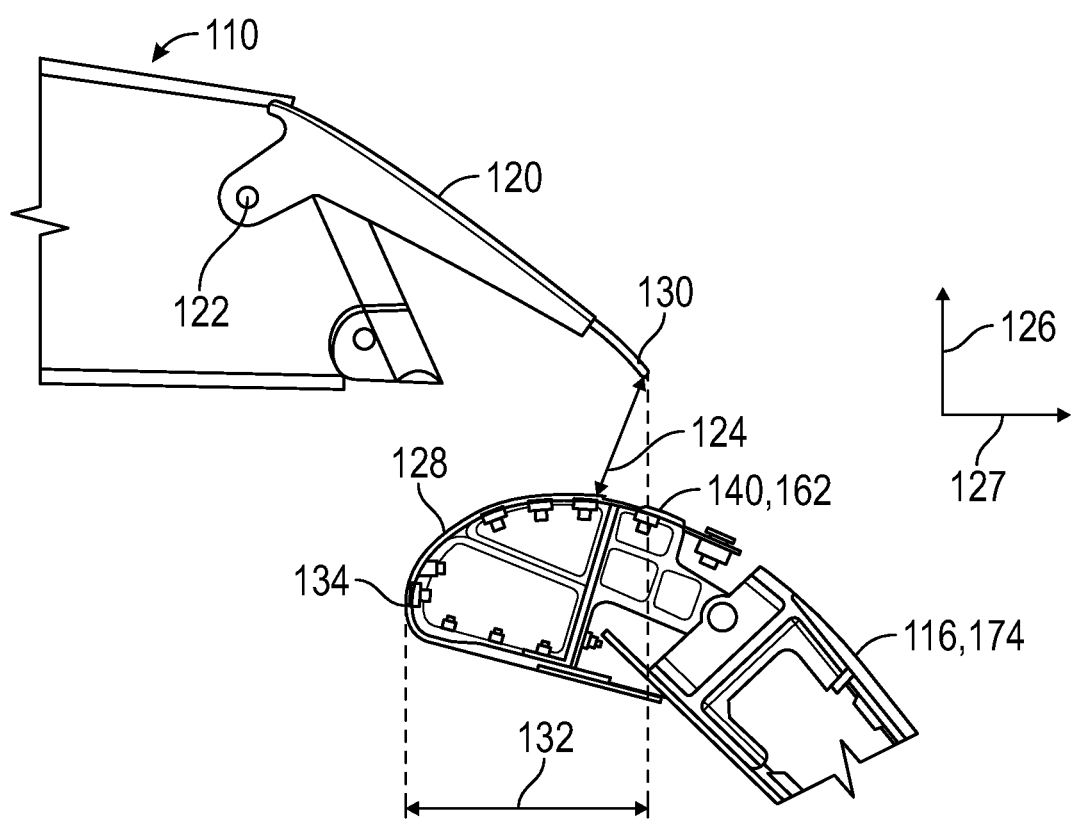
FIG. 9 is a schematic side view of the aerodynamic device.

With reference to FIGS. 8 and 9, an airflow 138 is enabled between the main aerodynamic body 110 and the flight control surface 116 while the flight control surface 116 is in a partially deflected position or the fully (shown) deflected position 174. A rotating body 140 is rotatable relative to and is coupled to the flight control surface 116. The airflow 138 is controlled by a gap 124 and an overlap 132 between the main aerodynamic body 110 and the rotating body 140. Adjustment of the gap 124 and/or the overlap 132 changes the airflow 138 between the main aerodynamic body 110 and flight control surface 116. The adjustment may be accomplished by the movement of the rotating body 140 between the stowed position 160 (FIG. 10) and a deployed position 162 (FIG. 8). In the stowed position 160, the rotating body 140 is in contact with (or close to) the main aerodynamic body 110 and so fills (or closes) the gap 124. In the deployed position 162, the rotating body 140 traverses (or rotates) out of the control plane 182 and so opens (or widens) the gap 124. The rotating body 140 may be moved and held at various positions between the stowed position 160 and the deployed position 162 to vary the size of the gap 124 and thus vary the airflow 138.

The aerodynamic device 103 may include a first shroud 120 that is pivotally coupled to the main aerodynamic body 110 and may be optionally configured as a spoiler. As a non-limiting example, a shroud hinge 122 may pivotally couple the first shroud 120 to the main aerodynamic body 110. In various embodiments, the gap 124 may be defined as a minimum (or shortest) distance between the rotating body 140 and the first shroud 120 (e.g., the aftmost point 130). In other embodiments, a similar gap may be defined from an uppermost point 128 of the flight control surface 116 to the aftmost point 130 of the first shroud 120 along a direction 126. The overlap 132 may be defined from a forward-most point 134 of the flight control surface 116 to the aftmost point 130 of the first shroud 120 along another direction 127. The direction 126 and the direction 127 may be orthogonal to each other.

The first shroud 120 is configured to pivot relative to the main aerodynamic body 110 thru a rotation 136 to adjust the size of the overlap 132 and/or the gap 124, which affects the airflow 138 between the main aerodynamic body 110 and the flight control surface 116. It is desirable to adjust the airflow 138 between the main aerodynamic body 110 and the flight control surface 116 depending on the circumstances. Therefore, it is desirable to adjust the position of the first shroud 120 relative to the flight control surface 116 to achieve various sizes for the overlap 132 and/or the gap 124.

Figure 10:
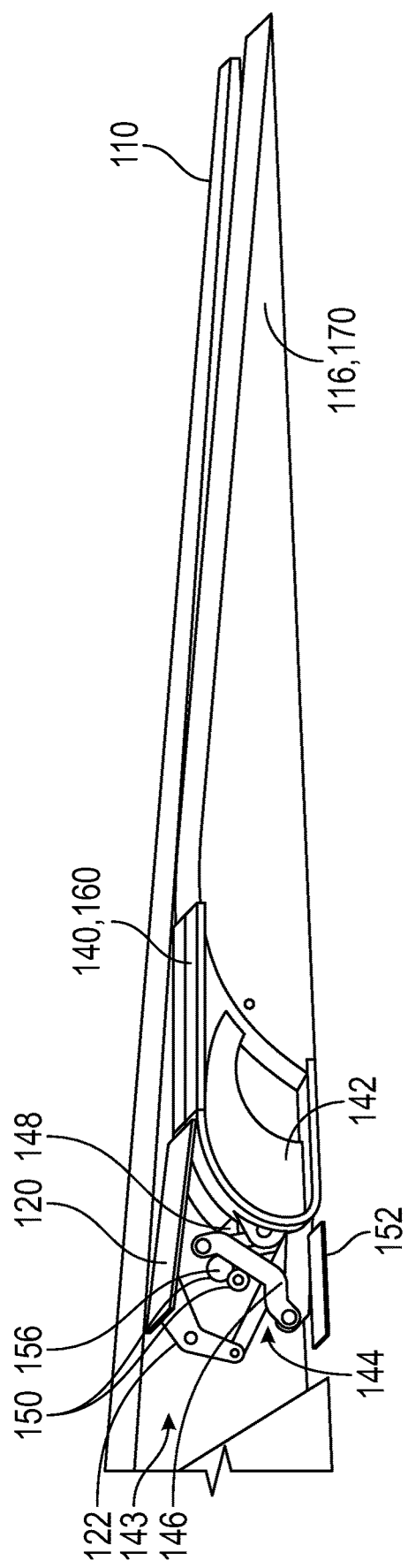
FIG. 10 is a schematic side view of the aerodynamic device showing the rotating body in the straight position.
Figure 11:
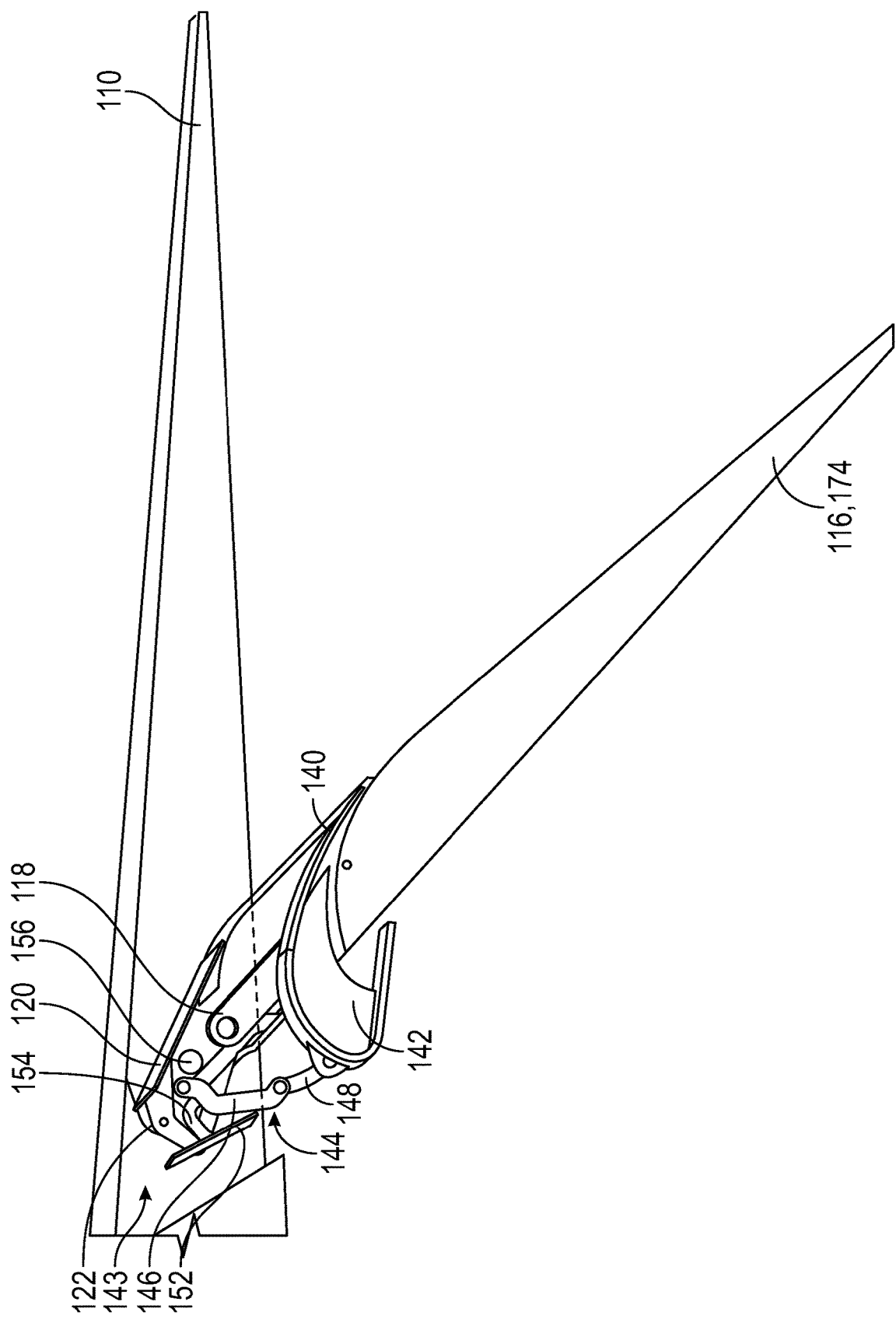
FIG. 11 is a schematic side view of the aerodynamic device showing the rotating body in the deployed position.

With reference to FIGS. 10 and 11, the aerodynamic device 103 includes a rotating body 140 coupled between the main aerodynamic body 110 and the flight control surface 116 (see also FIG. 6). The rotating body 140 is rotatable relative to the flight control surface 116 between the stowed position 160 (FIG. 10) and the deployed position 162 (FIG. 11) to adjust the airflow 138 (FIG. 8) flowing between the main aerodynamic body 110 and the flight control surface 116. To do so, the rotating body 140 is movably coupled to the flight control surface 116. As a consequence, the rotating body 140 is pivotable with respect to the flight control surface 116 between the stowed position 160 and the deployed position 162 to adjust the amount of the airflow 138 (FIG. 8) passing between the main aerodynamic body 110 and the flight control surface 116.

In the stowed position 160 (FIG. 5), a leading edge of the rotating body 140 is closer to the main aerodynamic body 110 than in the deployed position 162. Put another way, the rotating body 140 may be parallel to the control plane 182 of the flight control surface 116 while in the stowed position 160. The leading edge of the rotating body 140 may be tucked adjacent the first shroud 120 while in the stowed position 160. In the deployed position 162 (FIG. 8), the rotating body 140 is spaced apart from the main aerodynamic body 110. Put another way, the rotating body 140 may be oblique to the control plane 182 of the flight control surface 116.

In various embodiments, the rotating body 140 is configured as a nose of the flight control surface 116 that is sized and shaped to partially cover the flight control surface 116. It is envisioned, however, that the rotating body 140 may have other suitable configurations. By moving the rotating body 140 between the stowed position 160 and the deployed position 162, the overlap 132 and the gap 124 (FIG. 9) may be adjusted to various sizes, thereby adjusting the airflow 138 between the main aerodynamic body 110 and the flight control surface 116. The ability to adjust the size of the overlap 132 and/or the gap 124 by moving the rotating body 140 allows for the axis of rotation 125 (e.g., hinge line) of the flight control surface 116 to be inside the mold line of the aerodynamic device 103 or within the recess 123 of the main aerodynamic body 110. Accordingly, the aerodynamic device 103 does not implement the external bump 90 (FIG. 4), an external protuberance, or a mechanism external to the aerodynamic device 103 while the flight control surface 116 is stowed in the cruise configuration 172 (FIG. 5).

In various embodiments, the rotating body 140 may not extend along the entire length of the flight control surface 116. Rather, one or more static portions of the rotating body 140 may reside along a leading edge (e.g., left edge in the figures) of the flight control surface 116 and one or more rotating bodies 140 are positioned between the static portions. For example, the outer ends of the leading edge of the flight control surface 116 may be static portions coupled to the hinges 118 (see FIG. 6) and the rotating body 140 may occupy a remainder of the leading edge of the flight control surface 116.

With reference to FIGS. 10 and 11, the rotating body 140 includes one or more ribs 142 for enhancing the structural integrity of the rotating body 140. The upper and lower surfaces of the rotating body 140 may be covered by a static composite layup wrapping or aluminum skins. As a non-limiting example, about eighty percent of the upper and lower surfaces of the rotating body 140 may be covered by the static composite layup wrapping. About twenty percent of the rear portion of the rotating body 140 may be made of a flexible material, such as aerodynamic seal. The entire upper and lower surface could be a seal. There could also be a little seal (e.g., 5-10% of the upper side may be a seal). Further, the rotating body 140 may be pre-loaded to maintain contact with the flight control surface 116 while in both the deployed position 162 and the stowed position 160.

With continued reference to FIGS. 10 and 11, to move the rotating body 140, the aerodynamic device 103 may include a four-bar linkage 144 disposed fully, or at least partly in an interior cavity 143 of the main aerodynamic body 110. The four-bar linkage 144 may be referred to as the four-bar mechanism and acts passively based on the surface position. In the depicted embodiment, the four-bar linkage 144 includes a profiled crank link 146, which may be referred as a crank link and acts as a cam. The flight control surface 116 serves as a ground link of the four-bar linkage 144 and is therefore coupled to the profiled crank link 146. The rotating body 140 acts as a rocker link of the four-bar linkage 144 and is therefore coupled to the profiled crank link 146. The four-bar linkage 144 includes a coupler link 148 interconnecting the profiled crank link 146 (e.g., the crank link) and the rotating body 140 (e.g., the rocker link). The aerodynamic device 103 further includes a roller 150 statically attached to the main aerodynamic body 110. The roller 150 may be in direct contact to the profiled crank link 146. Thus, as the flight control surface 116 rotates, the roller 150 applies a force (e.g., downward as illustrated) onto the profiled crank link 146. The roller 150 therefore rotates the profiled crank link 146 relative to the flight control surface 116, deploying the rotating body 140. Thus, the configuration of the four-bar linkage 144 described above allows the rotating body 140 to rotate (or transition) between the stowed position 160 (FIG. 5) and the deployed position 162 (FIG. 8) in response to the rotation of the flight control surface 116. Other mechanisms to move the rotating body 140 may be implemented to meet the design criteria of a particular application.

With continued reference to FIGS. 10 and 11, the aerodynamic device 103 includes a second shroud 152 and a shroud link 154 coupled to the second shroud 152. The shroud link 154 is configured as a profiled link and is hinged to the main aerodynamic body 110. A cam 156 is connected to the flight control surface 116 and drives the shroud link 154. The second shroud 152 seals the local surface of the rotating body 140 up to the main aerodynamic body 110. Further, the second shroud 152 is configured to retract to allow the rotating body 140 to move to the deployed position 162.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The terms "A," "an," "the," "at least one," and "one or more" are used interchangeably to indicate that at least one of the items is present. A plurality of such items may be present unless the context clearly indicates otherwise. Numerical values of parameters (e.g., of quantities or conditions) in this specification, unless otherwise indicated expressly or clearly in view of the context, including the appended claims, are to be understood as being modified by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing multiple values and further divided ranges within the range.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

What is claimed is:

1. An aerodynamic device comprising:
   a main aerodynamic body having a leading edge and a trailing edge opposite the leading edge;

a flight control surface pivotably connected to the main aerodynamic body at an axis, wherein the axis is proximate the trailing edge of the main aerodynamic body; and
a rotating body coupled to the flight control surface, wherein:
the rotating body is rotatable relative to the flight control surface between a stowed position and a deployed position while the flight control surface is stationary relative to the main aerodynamic body, wherein:
rotation of the rotating body defines a gap between main aerodynamic body and the rotating body;
the rotating body is rotated toward the main aerodynamic body while in the stowed position to close the gap;
the rotating body is rotated away from the main aerodynamic body while in the deployed position to widen the gap; and
the gap adjusts an airflow flowing between the main aerodynamic body and the flight control surface.

2. The aerodynamic device of claim 1, wherein
the flight control surface rotates relative to the main aerodynamic body between a cruise configuration and a deflected configuration;
the rotating body is in the stowed position while the flight control surface is in the cruise configuration; and
the rotating body is adjustable between the stowed position and the deployed position while the flight control surface is in the deflected configuration.

3. The aerodynamic device of claim 2, wherein:
the flight control surface is aligned with a body plane defined by the main aerodynamic body while in the cruise configuration; and
the flight control surface is obliquely angled relative to the body plane defined the main aerodynamic body while in the deflected configuration.

4. The aerodynamic device of claim 2, further comprising a hinge pivotally connecting the flight control surface to the main aerodynamic body, wherein
the hinge remains inside the main aerodynamic body while the flight control surface moves between the cruise configuration and the deflected configuration.

5. The aerodynamic device of claim 1, further comprising a four-bar linkage at least partly disposed within the main aerodynamic body, wherein:
the four-bar linkage pivotally interconnects the main aerodynamic body and the rotating body; and
the four-bar linkage transitions the rotating body between the stowed position and the deployed position.

6. The aerodynamic device of claim 1, wherein the main aerodynamic body is one of a wing, a horizontal stabilizer, a vertical stabilizer, or a canard.

7. The aerodynamic device of claim 1, wherein the flight control surface is one of a flap, a flaperon, an aileron, an elevator, a rudder, or a ruddervator.

8. The aerodynamic device of claim 1, further comprising a first shroud pivotally coupled to the main aerodynamic body and configured to further define the gap.

9. The aerodynamic device of claim 8, wherein a rotation between the first shroud and the main aerodynamic body defines an overlap between an aftmost point on the first shroud and a forward-most point of the rotating body that further adjusts the airflow.

10. An aircraft comprising:
a fuselage; and
a wing coupled to the fuselage, wherein the wing comprises:
a main aerodynamic body having a leading edge and a trailing edge opposite the leading edge;
a flight control surface pivotably connected to the main aerodynamic body at an axis, wherein the axis is near the trailing edge of the main aerodynamic body; and
a rotating body coupled to the flight control surface, wherein:
the rotating body is rotatable relative to the flight control surface between a stowed position and a deployed position while the flight control surface is stationary relative to the main aerodynamic body, wherein:
rotation of the rotating body defines a gap between main aerodynamic body and the rotating body;
the rotating body is rotated toward the main aerodynamic body while in the stowed position to close the gap;
the rotating body is rotated away from the main aerodynamic body while in the deployed position to widen the gap; and
the gap adjusts an airflow flowing between the main aerodynamic body and the flight control surface.

11. The aircraft of claim 10, wherein:
the flight control surface is pivotally coupled to the main aerodynamic body to facilitate pivotable movement of the flight control surface relative to the main aerodynamic body between a cruise configuration and a deflected configuration;
the rotating body is adjustable between the stowed position and the stowed position while the flight control surface is in the cruise configuration; and
the rotating body is in the deployed position while the flight control surface is in the deflected configuration.

12. The aircraft of claim 11, wherein:
the flight control surface is aligned with a body plane defined by the main aerodynamic body while in the cruise configuration; and
the flight control surface is obliquely angled relative to the body plane defined the main aerodynamic body while in the deflected configuration.

13. The aircraft of claim 11, further comprising a hinge pivotally connecting the flight control surface to the main aerodynamic body, wherein
the hinge remains inside the main aerodynamic body while the flight control surface moves between the cruise configuration and the deflected configuration.

14. The aircraft of claim 10, further comprising a four-bar linkage at least partly disposed within the main aerodynamic body, wherein:
the four-bar linkage pivotally interconnects the main aerodynamic body and the rotating body; and
the four-bar linkage transitions the rotating body between the stowed position and the deployed position.

15. The aircraft of claim 10, wherein the main aerodynamic body is one of a horizontal stabilizer, a vertical stabilizer, or a canard.

16. The aircraft of claim 10, wherein the flight control surface is one of a flap, a flaperon, an aileron, an elevator, a rudder, or a ruddervator.

17. The aircraft of claim 10, further comprising a first shroud pivotally coupled to the main aerodynamic body and configured to further define the gap.

18. The aircraft of claim 17, wherein a rotation between the first shroud and the main aerodynamic body defines an overlap between an aftmost point on the first shroud and a forward-most point of the rotating body that further adjusts the airflow.

19. A method for aerodynamic control, comprising:
pivotably connecting a flight control surface to a main aerodynamic body at an axis, wherein the axis is proximate a trailing edge of the main aerodynamic body;
coupling a rotating body to the flight control surface, wherein the rotating body is rotatable relative to the flight control surface between a stowed position and a deployed position while the flight control surface is stationary relative to the main aerodynamic body, wherein:
rotation of the rotating body defines a gap between the main aerodynamic body and the rotating body;
rotating the rotating body toward the main aerodynamic body while in the stowed position to close the gap;
rotating the rotating body away from the main aerodynamic body while in the deployed position to widen the gap, and
the gap adjusts an airflow flowing between the main aerodynamic body and the flight control surface.

20. The aerodynamic device according to claim 8, further comprising a second shroud on an opposite side of the main aerodynamic body as the first shroud, wherein the second shroud is configured to:
seal a space between the rotating body and the main aerodynamic body while the rotating body is in the stowed position; and
retract from the rotating body to allow the rotating body to move to the deployed position.

\* \* \* \* \*